Figure 1:
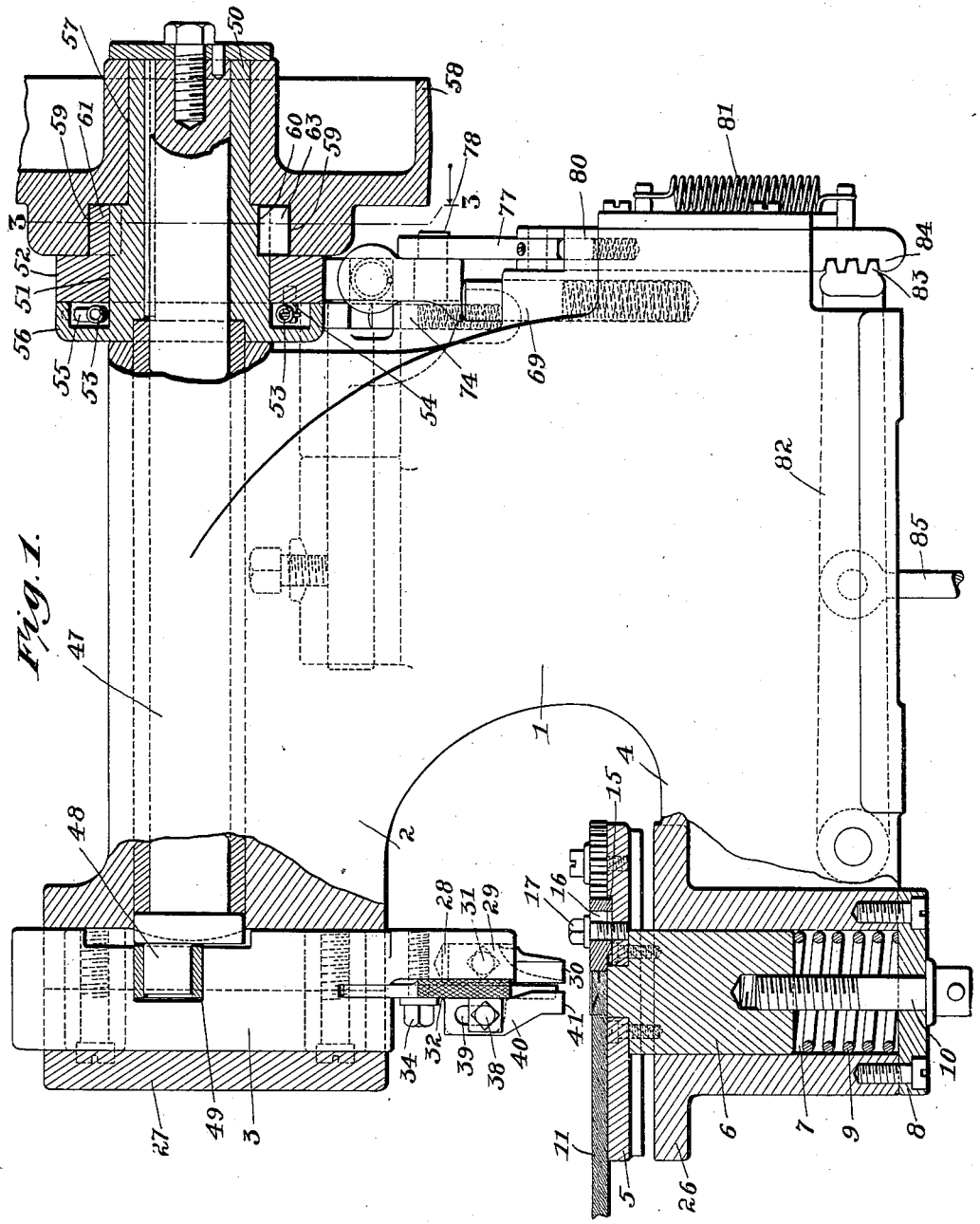

J. B. HADAWAY.
INSOLE TOE CUTTING MACHINE.
APPLICATION FILED OCT. 13, 1910.

1,087,578.

Patented Feb. 17, 1914.

2 SHEETS—SHEET 1.

Witnesses:
E. C. Wurdeman
Geo. L. Stebbins.

Inventor
John B. Hadaway
Phillips Van Everen & Fish
by Ira L. Fish
Attys

J. B. HADAWAY.
INSOLE TOE CUTTING MACHINE.
APPLICATION FILED OCT. 13, 1910.
1,087,578.
Patented Feb. 17, 1914.
2 SHEETS—SHEET 2.
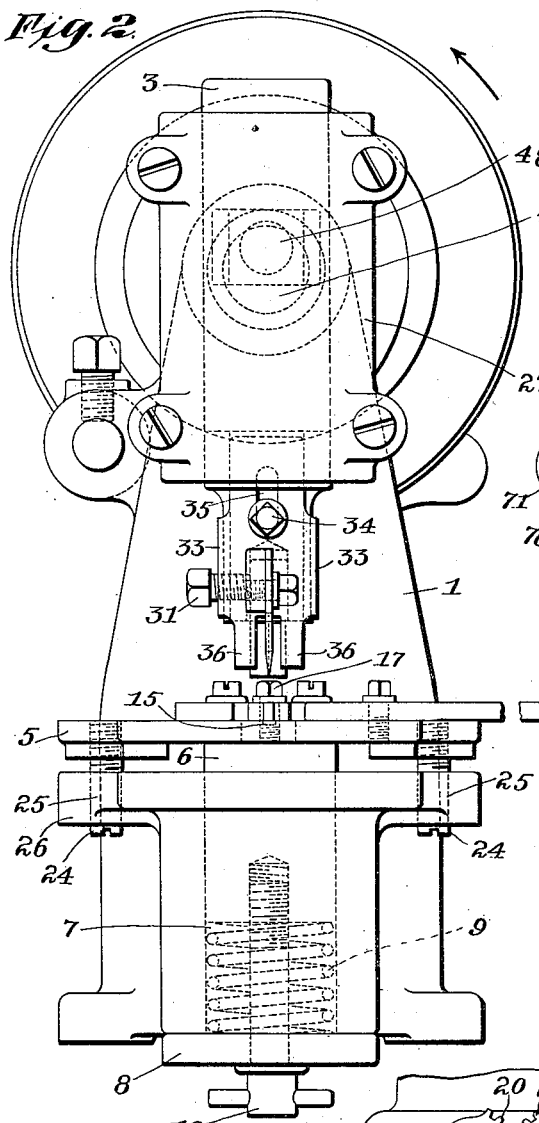
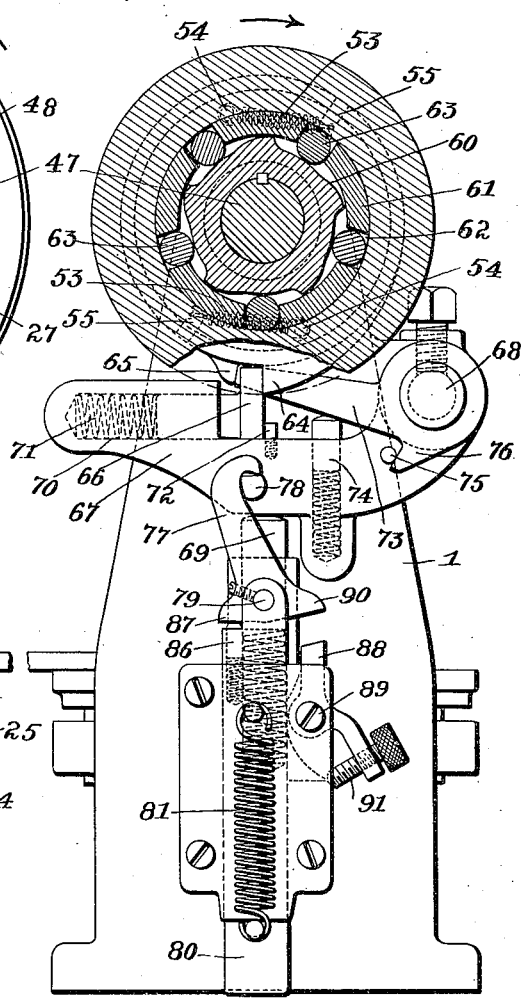
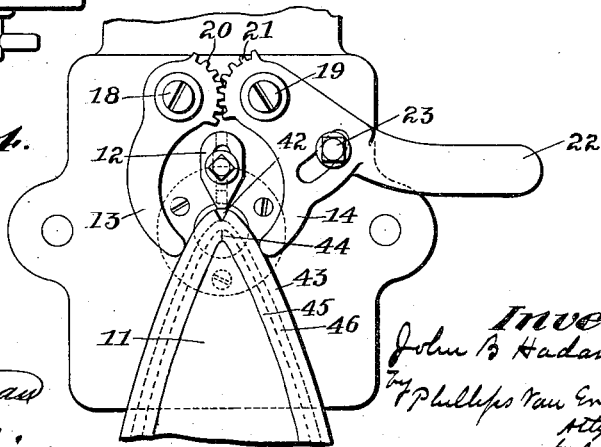
Witnesses:
Inventor:

UNITED STATES PATENT OFFICE.

JOHN B. HADAWAY, OF SWAMPSCOTT, MASSACHUSETTS, ASSIGNOR TO UNITED SHOE MACHINERY COMPANY, OF PATERSON, NEW JERSEY, A CORPORATION OF NEW JERSEY.

INSOLE-TOE-CUTTING MACHINE.

1,087,578.

Specification of Letters Patent.

Patented Feb. 17, 1914.

Application filed October 13, 1910. Serial No. 586,836.

*To all whom it may concern:*

Be it known that I, JOHN B. HADAWAY, a citizen of the United States, residing at Swampscott, in the county of Essex and State of Massachusetts, have invented certain new and useful Improvements in Insole-Toe-Cutting Machines; and I do hereby declare the following to be a full, clear, and exact description of the invention, such as will enable others skilled in the art to which it appertains to make and use the same.

In the manufacture of insoles it is usual to provide a lip by slitting the insole around its edge, and to provide a channel flap by cutting diagonally into the material of the insole around and toward the sole edge. In the process of sewing the welt to the insole, and in the process of reinforcing the insole with canvas preliminary to its use in a shoe, it is necessary that the lip and channel flap, either singly or together, be turned up from the surface of the insole. At the toe, and especially at the tip of a pointed-toe insole, considerable difficulty is encountered in turning up the lip and the channel flap. In turning up the lip, since the perimeter of the edge of the lip is longer than its base, the lip will of necessity be puckered or crimped at the toe, which, owing to the stiffness of the leather, prevents it from readily being turned up, and after it is turned up the crimped edge of the lip causes an objectionable bunch at the toe of the insole. The channel flap also resists being turned up since around its curve at the toe portion the perimeter of the edge of the channel flap is shorter than its base so that when the channel flap is raised at one side of the toe it will draw down or relay the channel flap at the opposite side of the toe.

One object of the present invention is to provide mechanism which shall so cut into the lip and the channel flap that they may be more easily turned up at the toe. This is accomplished in the case of the lip by transversely cutting through the lip to form a V-shaped notch therein at the point of the toe. This removes from the lip the portion which would otherwise be crimped in turning up the lip and the angle of the V-shaped cut is such that the edges of the V-shaped notch will meet when the lip is turned up. In order that the channel flap may be turned up, a single straight incision is made transversely of the channel flap at the toe. This allows the channel to be easily opened up and the channel flap turned up since raising of the channel flap at one side of the toe can no longer draw down the channel flap at the opposite side.

In slitting the edge of the insole, and in cutting the channel, the depth of the cuts is gaged from the upper or flesh side of the insole. In order that the notch cut in the lip and the transverse cut through the channel flap shall always be uniform with relation of the slot and channel, it is necessary that the depth of the cuts through the lip and channel flap shall also be gaged from the upper or flesh side of the insole.

Another object of the present invention is to so construct the cutting mechanism that the depth of the cuts through the lip and channel flap shall be uniform with relation thereto regardless of the varying thickness of different insoles. This is accomplished in the present machine by placing the grain or finished side of the insole against a yieldable work table, and having to coöperate therewith knives for cutting into the flesh side of the insole, and a presser-foot fixed to the knife carrying head to regulate the depth of cut of the knives by pressing against the flesh side of the insole and moving back the yieldable table when the knives have cut into the insole the distance that they project beyond the face of the presser-foot.

Other objects of the present invention are to provide a clutch-releasing mechanism which will automatically cause but a single cutting stroke of the knives when the actuating treadle is moved by the operator, to provide adjustment for rendering said clutch operative to run the knives continuously if desired, and to provide suitable gages for positioning the insole on the work table.

With these objects in view, the present invention consists in insole toe-cutting means as hereinafter described and claimed.

A machine embodying the present invention in a preferred form is illustrated in the accompanying drawings, in which—

Figure 5:
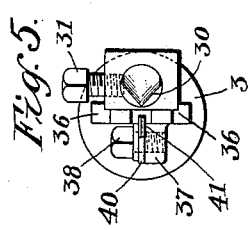

Figure 1 is a side elevation of the head of the machine taken partly in section; Fig. 2 is a front elevation of the machine head; Fig. 3 is a rear elevation of the machine head taken partly in section along the line 3—3 of Fig. 1; Fig. 4 is a top view of the work table; and Fig. 5 is a bottom view of the presser-feet and cutting knives.

The head 1 of the machine is mounted upon a suitable pedestal (not shown), and is formed with an overhanging arm 2 in which is mounted a reciprocating plunger 3, which bears the cutting knives to incise an insole held upon a yieldable work table. The work table consists of a flat work supporting plate 5 carried upon a plunger 6 which is slidably held in a vertical bore formed through the forwardly projecting arm 4 of the machine head. The lower opening of the bore 7 is closed with a flat plate, which forms the lower abutment for a helical spring 9 which yieldably presses the plunger 6 upwardly and holds the work table in an elevated position. The upward limit of the plunger 6 is limited by the engagement with the plate 8 of the flanged head of a bolt 10, which passes through the plate 8 and engages in a screw-threaded recess in the bottom of the plunger 6. By adjusting the bolt 10 the raised position of the work supporting table under the action of the spring 9 can be fixed. The toe of an insole 11 which is placed upon the work table is positioned by a gage 12 which engages the tip of the toe and by gages 13 and 14 which engage the sides of the toe. The gage 12 is formed with a downwardly projecting spline 15 which is slidably received in a recess 16 formed in the work table, and the gage 12 is clamped in position by means of a clamping bolt 17, which holds it firmly to the work table. The gages 13 and 14 are pivoted at 18 and 19 respectively to the work table, and have formed upon their rear ends the intermeshing segmental gears 20 and 21 which mechanically link the gages together so that when they are positioned by means of a hand lever 22 they will have the same relative positions on either side of the insole. The gage piece 14 is slotted to receive a clamping bolt 23 by which the gage pieces 13 and 14 are clamped in adjusted positions. The work table is held from turning with the plunger 6 as a pivot by means of guide pins 24 which are screwed to the under side of the plate 5 and are free to slide vertically in guiding recesses 25 formed in the flange 26 of the machine head.

The knife bearing plunger 3 is slidably held to the overhanging arm 2 of the machine frame by a bolted plate 27 and is arranged to be vertically reciprocated over the work table. The lower end of the plunger 3 has its front portion cut away and its rear portion is formed in a socket 28 to receive a knife block 29, upon whose lower end is formed the V-shaped cutting edge 30. The knife block 29 may be vertically adjusted relative to the plunger 3 and clamped in the socket 28 by means of a clamping bolt 31.

Fitted on the front face of the lower end of the plunger 3 is the presser-foot bar 32, which is held against a sidewise or a twisting movement by the flanges 33 formed thereon, which extend backwardly and engage a short distance over the sides of the plunger 3. The presser bar 32 is vertically adjustable on the plunger 3 and is held clamped thereto in its adjusted position by means of a clamping bolt 34 which it receives through a slot 35. The lower end of the presser bar 32 is bifurcated to form two presser feet 36 which are adapted to bear against the work. An ear 37 is formed upon the front face of the presser bar 32 which is bored and screw-threaded to receive a bolt 38 which engages through a slot 39 in a knife bar 40 and clamps it to the presser bar, the slot 39 allowing for vertical adjustment of the knife bar relative to the presser bar. The lower end of the knife bar 40 is rearwardly offset to some extent so that the straight cutting edge 41, which is formed upon the lower end of the knife bar will lie between the two presser feet 36. The arrangement of the knives and presser feet is such that the V-shaped knife 30 will engage the tip of the insole and cut out a V-shaped notch 42 in the lip 43 thereof, and the cutting edge 41 will make a straight transverse incision 44 across the channel flap 45, while the presser feet 36 will engage the insole at the sides of the cutting knife 42 upon the between substance 46.

The vertical adjustments of the cutting edges 30 and 41, relative to the presser feet 36, are such that they project beyond the bottom of the presser feet 36 the distance that it is desired to cut into the insole. When the plunger 3 is moved downwardly for the cutting stroke the knives will cut into the insole a depth equal to the distance that they project beyond the presser feet 36. Then the presser feet 36 will engage the insole and force the yieldable work table downwardly, thus insuring that the depth of cut of the knives shall always be the distance which they project beyond the presser feet 36. This arrangement allows for the accommodation of insoles of varying thicknesses, since for a thick insole the presser feet will merely move the table downwardly a greater amount. The cut of the V-shaped knife at 30 is of a depth sufficient to cut through the lip of the insole without materially penetrating the feather of the insole, and the cut of the straight-edged knife 41 is of a depth sufficient to cut through the channel flap without materially cutting into the bottom of the channel. Since in the manufacture of insoles the cutting of the slit and channel is gaged from the upper or flesh side of the insole, the lip and channel flap are of the same thickness even upon insoles of varying thickness so that the knives 30 and 41, whose depth of cut is regulated from the upper or flesh side of the insole, will cut through the lip and channel flap uniformly on insoles of varying thicknesses.

The plunger 3 is given a reciprocatory movement by a shaft 47 rotatably mounted in a bearing formed through the head of the machine. The front end of the shaft 47 bears a wrist pin 48 which is journaled in a box 49 transversely slidable across a recess cut in the rear side of the plunger 3, thus transforming the rotary motion of the shaft into a reciprocatory motion of the plunger. Upon the rear end of the shaft 47 is splined a sleeve 50. The forward end of the sleeve 50 is formed with a circular bearing surface 51 upon which is loosely mounted a roll carrier 52. The roll carrier is yieldably held against rotation in one direction relatively to the sleeve 50 by springs 53 connecting it thereto. The springs 53 are secured between the pins 54 which extend laterally from the roll carrier 52 and the pins 55 which extend inwardly from the hollow flange 56 of the sleeve 50, the hollow in the flange forming a recess for the reception of the springs and their holding pins. The rear end of the sleeve 50 is somewhat reduced to form a circular bearing 57 upon which is loosely mounted a power driven pulley wheel 58. The front of the pulley wheel 58 is formed with a hub whose interior is turned to form a bearing surface 59 which surrounds the portion of the sleeve 50 which lies between the bearing surfaces 51 and 57, which portion of said sleeve is formed with a plurality of cam surfaces 60. The roll carrier 52 has laterally extending fingers 61 which project between the interior bearing surface 59 of the pulley wheel hub and the cam surfaces 60 formed on the sleeve 50. In the slots 62 between the fingers 61 of the roll carrier, are loosely carried clutching rolls 63 of such size that when these slots lie over the recessed portions of the cam surfaces 60 the rolls 63 will lie loosely between the cams and the interior bearing surface 59, but when the rolls are drawn upon the raised portions of the cam surfaces 60 they will be wedged between the cam surfaces 60 and the interior bearing 59 and form clutching members to cause the power driven pulley wheel 58 to rotate the shaft 47. The direction of pull of the springs 53 is such that the roll carrying fingers 61 tend to move the rolls 63 upon the raised portions of the cams, and the direction of rotation of the pulley wheel 58 is such that when the rolls engage with the cams the movement of the bearing surface 59 will tend to cause them to be rolled still farther on to the raised parts of the cams and wedged into tighter clutching engagement therewith. The roll carrier 52 has a smooth peripheral bearing surface which at one point is provided with a single ratchet-like lug 64 facing in the direction that shaft 47 rotates. The flange 56 also has a smooth peripheral bearing surface provided at one point with a single ratchet-like lug 65 which faces oppositely to the lug 64. When the clutch is in operative position and the clutch rolls engage the cam surfaces, the lugs 64 and 65 lie approximately side by side. To hold the clutch in inoperative position, the oppositely facing lugs 64 and 65 are engaged by suitable stops or dogs which hold the lugs apart, as shown in Fig. 3, in which position the springs 53 are somewhat extended and the roll carrier 52 holds the rolls over the recessed parts of the cam surfaces so that the pulley wheel 50 may run freely about the driving shaft.

The dog which engages the lug 64 on the roll carrier is preferably formed of a spring bunter 66 which is mounted upon an arm 67 pivoted at 68 to the machine head, and the bunter is normally held against the periphery of the roll carrier 52 by a spring-pressed plunger 69 which tends to elevate the arm 67. The bunter 66 is suitably received in a socket 70 and cushioned by a spring 71, the tendency of the plunger to be moved out of its socket by the spring 71 being checked by a stop pin 72. The dog which engages the lug 65 is formed of a stop finger 73 which is pivoted about the same center 68 as the arm 67. A spring-pressed plunger 74 carried by the arm 67 normally holds the stop finger 73 in engagement with the periphery of the flange 56. A pin 75 carried by the arm 67 is adapted to engage against a shoulder 76 on the pivoted stop finger 73 and move it downwardly when the arm 67 is depressed.

The arm 67 is arranged to be pulled downwardly to free the clutch lugs from their engaging dogs by means of the latch piece 77 whose hooked end engages over a pin 78 projecting from the side of the arm 67. The latch piece 77 is pivoted at 79 to the upper end of a slide bar 80 which is normally held elevated by a helical spring 81 but which is adapted to be depressed and draw the latch piece 77 downwardly by means of a lever 82 whose rear end bears teeth 83 meshing with a rack 84 on the bar 80, the lever 82 being drawn downwardly by a rod 85 running to a treadle conveniently attached to the base of the machine pedestal. The operator by depressing the treadle may thus at any time release the dogs from the clutch and cause the power-driven pulley wheel to actuate the cutting knives. The pivoted latch piece is normally held in engagement with the pin 78 by means of a spring-pressed plunger 86 held in a recess formed in the upper end of the slide bar 80 and engaging under the shoulder 87 of the latch piece 77. To release the latch 77 from the pin 78, a stop piece 88 is pivoted at 89 to the machine frame and arranged to be held by means of an adjusting screw 91 in the path of a shoulder 90 formed upon the side of the latch piece 77 opposite to the shoulder 87. When the treadle-operated bar 80 is moved downwardly, the latch piece 77, by its engagement with the pin 78, will draw down the lever 67. However, near the downward limit of the movement of the slide bar 80, the shoulder 90 will be brought against the stop piece 88 which will force the pivoted latch piece 77 over against the pressure of the spring 86, releasing the pin 78 and allowing the lever 67 to move upwardly under the action of the spring-pressed plunger 69. Thus it will be seen that the action of the pivotal latch 77 and the stop 88 is such that when the treadle is depressed the lever arm 67 will first be moved downwardly and then immediately be released to fly back to its upward position. When it is desired that the arm 67 be held down as long as the treadle is depressed and the dogs held out of engagement with the clutch lugs, the adjusting screw 91 is turned outwardly to allow the stop 88 to drop out of the path of the shoulder 90, so that when the treadle is depressed the latch 77 will no longer be tripped but will be held in engagement with the pin 78.

The operation of the machine is as follows: When the clutch is in its inoperative position, as shown in Fig. 3, (the normal direction of rotation of the pulley wheel being indicated by the arrow) the operator places the insole which is to be cut upon the work table and depresses the foot treadle. This moves the bar 80 and latch 77 downwardly, the latch 77 drawing down the arm 67 and retracting the spring bunter 66 and the stop finger 73 from the lugs 64 and 65. The roll carrier 52, now being free, will be turned by the springs 53 to bring the rolls 63 upon the raised portions of the cam surfaces 60 where they are gripped between the bearing surfaces 59 and the cams to cause the pulley wheel 58 to turn the shaft 47. After the arm 67 has been moved downwardly far enough to have released the clutch lugs 64 and 65, the latch 77 is tripped and the arm 67 allowed to spring upwardly, so that the spring bunter 66 and the stop finger 72 will be held against the peripheral bearing surfaces of the roll carrier 52 and the flange 56 in a position to engage the clutch lugs 64 and 65 at the end of a single revolution. When the shaft has completed a single revolution, the lug 64 will strike against the spring bunter 66 and arrest the movement of the roll carrier 52, which will hold the rolls 53 stationary while the continued movement of the shaft and sleeve will carry on the cam surfaces until their recessed portions are under the rolls 63, thus freeing the rolls from their wedging engagement and releasing the clutch to allow the pulley to turn freely about the sleeve 50. The movement of the shaft will be checked by action of the springs 53, but not, however, until the shaft and sleeve are turned by their angular momentum enough to carry the lug 65 beyond the end of the finger 73, which will spring up and engage behind the lug 65 and prevent the return movement of the sleeve 50, so that the springs 53 are left somewhat extended and the rolls 63 held in their inoperative position. The plunger 3 has now made a single cutting stroke, and the operator places another insole upon the work table and again depresses the treadle, whereupon the cutting operation is repeated, the automatic release of the clutch allowing but a single cutting stroke to be made into the insole. If, however, the operator desires that the machine shall run continuously, the screw 91 is loosened to remove the stop piece 88 from the path of the shoulder 90 and the treadle held down, whereupon, since the dogs are held out of engagement with the clutch lugs, the machine will run continuously until the operator releases the treadle. It is obvious from an inspection of the clutch and its engaging dogs that the stop finger 73 would perform its function without the employment of the pin 75 to depress it when the arm 67 is lowered. The use of pin 75 is, however, desirable, since when the machine is running continuously the depression of the finger 73 will remove it from the path of the ratchet-like lug and obviate any pounding between them.

While a preferred form of clutch is illustrated, it is to be understood, however, that any other suitable form of clutch may be used which will properly coöperate with the improved device for releasing it at the end of a single revolution.

In the above-described machine embodying a preferred form of the invention, the work table is made yieldable and a positive movement given to the cutting knives and presser-foot. The employment of a structure in which the work table is fixed and in which yielding means is interposed between the knives and presser-feet on one hand and the driving means on the other hand, so that the movement of the knives relative to the insole may be arrested upon the engagement of the presser-feet with the surface of the insole, is contemplated within the spirit of the present invention.

In the embodiment of the invention as illustrated in the accompanying drawings, two knives are shown, one to cut the lip and the other to cut the channel flap. These knives are made removable, and it is to be understood that the use of either one of the knives singly to cut either the lip or the channel flap is contemplated within the spirit of the present invention. It is also to be understood that the present invention contemplates varying the position, size, and shape of the cutting knives to accommodate insoles of varying shape or size, or for cutting notches or slits of different shape therein.

The above disclosed machine in which the present invention is illustrated as embodied, is shown and described as operating upon an insole on which had been previously formed the lip and the channel flap. The operation of this machine in making its incisions into the insole may be equally well performed upon an insole before the lip and channel flap are formed, as it will be obvious that the resultant condition of the insole will be the same in whichever order the operation of edge slitting and channeling and the operation performed by the above described machine, be performed. The words in the specification and in the appended claims describing the operation of one knife as cutting a notch from the lip of the insole and of the other knife as incising the channel flap, are to be understood as words of description of the location of the cuts on the insole, and not as words of limitation to restrict the operation of these knives as making their cuts after the lip and channel flap have been formed, as it is obvious that the relative location of these cuts will be the same upon an insole in which the edge slit and the channel have not previously been cut.

Having thus described the present invention, what is claimed is:

1. An insole toe cutting machine, having, in combination, a work table, two power-driven knives to coöperate therewith, one of said knives being arranged to incise the lip of an insole placed on the work table and the other of said knives being arranged to incise the channel flap of said insole, and gaging means to position the insole with relation to the knives.

2. An insole toe cutting machine, having, in combination, a work table, two power-driven knives to coöperate therewith, one of said knives being arranged to cut out a notch from the lip of an insole placed on the work table, and the other of said knives being arranged to incise the channel flap of said insole, and gaging means to position the insole with relation to the knives.

3. An insole toe cutting machine, having, in combination, a work table, a reciprocating head to coöperate therewith bearing both a V-shaped knife for notching the lip of the insole held on the work table, and a knife for incising the channel flap of said insole, and gaging means to position the insole with relation to the knives.

4. An insole toe cutting machine, having, in combination, a work table, a reciprocating head to coöperate therewith bearing both a V-shaped knife for notching the lip of an insole held upon the work table and a second knife for incising the channel flap of said insole, a continuously running driving means, a manually-operable clutch for connecting said driving means to the reciprocating head, means for automatically releasing the clutch after a single reciprocation of said head, and gaging means to position the insole with relation to the knives.

5. An insole toe cutting machine, having, in combination, a work table, a reciprocating presser-foot coöperating therewith to engage an insole held on the work table, a cutting knife moving with and projecting beyond the presser-foot to incise said insole, and yieldable means for arresting the movement of the knife relative to said insole upon the engagement of the presser-foot with the insole, whereby the depth of the incision of the knife shall be determined by the distance that the knife projects beyond the presser-foot.

6. An insole toe cutting machine, having, in combination, a yieldable work table, a reciprocating head to coöperate therewith, a presser-foot mounted on said head to engage an insole held on the yieldable work table, and a cutting knife mounted on said head and projecting therefrom beyond the presser-foot to incise said insole, whereby the depth of the incision of the knife shall be determined by the distance that the knife projects beyond the presser-foot.

7. An insole toe cutting machine, having, in combination, a yieldable work table, a reciprocating head to coöperate therewith, a presser-foot mounted on said head to engage an insole held on the yieldable work table, a cutting knife mounted on said head and projecting therefrom beyond the presser-foot to incise said insole whereby the depth of the incision of the knife shall be determined by the distance that the knife projects beyond the presser-foot, and means for adjusting the positions of the presser-foot and knife relative to each other to vary the depth of the incision of the knife.

8. An insole toe cutting machine, having, in combination, a work table to support the insole to be cut, a spring pressing said table upwardly, means to limit the upward movement of said table under the action of the spring, a presser-foot adapted to engage the insole and depress the table, and a knife moving with and projecting beyond the presser-foot to make an incision in the upper surface of the insole of a depth equal to the distance that the knife projects beyond the presser-foot.

9. An insole toe cutting machine having, in combination, a work table for supporting an insole, a reciprocating plunger bearing a cutting knife for incising the insole held upon the work table, said parts being so arranged that the knife makes an incision extending only partly through the insole, a rotatably mounted shaft having a crank engaging the plunger to impart a single reciprocation to the plunger for each rotation of the shaft, a power-driven pulley wheel loosely mounted on the shaft, a clutch constantly tending to lock the pulley wheel to the shaft but normally held in an inoperative position, and means arranged to be initially set in operation by the operator but afterward acting automatically to allow the clutch to instantaneously lock the pulley wheel to the shaft, irrespective of the position of the pulley wheel on the shaft to render the clutch inoperative at the end of a single revolution of the shaft and to arrest the shaft with the plunger in raised position.

10. An insole toe cutting machine having, in combination, a work table for supporting an insole, a reciprocating plunger bearing a cutting knife for incising the insole held upon the work table, said parts being so arranged that the knife makes an incision extending only partly through the insole, a rotatably mounted shaft having a crank engaging the plunger to impart a single reciprocation to the plunger for each rotation of the shaft, a power-driven pulley wheel loosely mounted on the shaft, and means under the control of the operator for locking the pulley wheel to the shaft and afterward acting automatically to unlock the pulley wheel from the shaft at the end of a single revolution and to arrest the shaft with the plunger in raised position.

11. An insole toe cutting machine having, in combination, a work table for supporting an insole, a reciprocating plunger bearing a cutting knife for incising the insole held upon the work table, said parts being so arranged that the knife makes an incision only partly through the insole, a rotatably mounted shaft having a crank engaging plunger to impart a single reciprocation to the plunger for each rotation of the shaft, a power-driven pulley wheel loosely mounted on the shaft, and means under the control of the operator for locking the pulley wheel to the shaft and afterward acting automatically to unlock the pulley wheel from the shaft at the end of a single revolution and to arrest the shaft with the plunger in raised position comprising a spring against which the momentum of the shaft is expended when it is arrested.

12. An insole toe cutting machine having, in combination, two work engaging members, namely a work table and a coöperating presser foot, the presser foot bearing a cutting knife rigidly mounted thereon and projecting beyond the work engaging face of the presser foot to incise said insole, means for relatively reciprocating the work table and presser foot in a direction at right angles to the surface of the work table in order to engage and clamp an insole between them and cause said cutting knife to make an incision in the insole having the outline of the knife edge and extending into and partially through the insole at right angles to its surface, and a yielding mounting for one of said work engaging members to cause the movement of the knife relatively to the insole to be arrested upon the engagement of the presser foot with the insole whereby the depth of the incision of the knife is determined by the distance that the knife projects beyond the presser foot.

JOHN B. HADAWAY.

Witnesses:
  George E. Stebbins,
  Annie C. Richardson.

---

Copies of this patent may be obtained for five cents each, by addressing the "Commissioner of Patents, Washington, D. C."